(12) United States Patent
Biehler et al.

(10) Patent No.: US 8,041,858 B2
(45) Date of Patent: Oct. 18, 2011

(54) METHOD OF CLOCK DISTRIBUTION FOR OPERATING AN AUTOMATION SYSTEM

(75) Inventors: Georg Biehler, Nürnberg (DE); Andreas Löwe, Neumarkt (DE); Ines Molzahn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 173 days.

(21) Appl. No.: 12/482,645

(22) Filed: Jun. 11, 2009

(65) Prior Publication Data

US 2009/0312855 A1    Dec. 17, 2009

(30) Foreign Application Priority Data

Jun. 12, 2008   (EP) .................................... 08010730

(51) Int. Cl.
*G06F 3/00* (2006.01)
*G06F 1/12* (2006.01)
*G06F 1/00* (2006.01)
*G06F 1/04* (2006.01)

(52) U.S. Cl. .............. 710/58; 710/60; 710/61; 713/400; 713/500; 713/600

(58) Field of Classification Search ........................ None
See application file for complete search history.

(56) References Cited

U.S. PATENT DOCUMENTS

| 6,202,000 | B1 | 3/2001 | Rheem |
| 7,447,931 | B1 * | 11/2008 | Rischar et al. ................ 713/400 |
| 2005/0123000 | A1 | 6/2005 | Hashimoto |

FOREIGN PATENT DOCUMENTS

| DE | 19723956 A1 | 12/1998 |
| EP | 1527578 | 5/2005 |

* cited by examiner

*Primary Examiner* — Alan Chen

(57) ABSTRACT

A method of operating an automation system with a plurality of automation devices connected for communication with a central unit is provided. Each automation device handles communication in accordance with a send clock. The central unit stores for each automation device accessible for communication information about the send clock for this device in a database. Further, the central unit handles communication with the automation devices according to their individual send clock.

12 Claims, 2 Drawing Sheets

METHOD OF CLOCK DISTRIBUTION FOR OPERATING AN AUTOMATION SYSTEM

CROSS REFERENCE TO RELATED APPLICATIONS

This application claims priority of European Patent Application No. 08010730.3 EP filed Jun. 12, 2008, which is incorporated by reference herein in its entirety.

FIELD OF INVENTION

The invention relates to a method for operating an automation system. Automation systems are known per se and usually comprise a number of automation units connected for communication with at least one central unit, i.e. control devices, operating and observation devices, local peripheral devices, sensors and actors with bus capabilities etc. for example, with each automation device handling communication in accordance with a send clock.

SUMMARY OF INVENTION

In the automation system the automation units connected for communication and the central unit or each central unit provided for their control are intended for an automation solution and accordingly control and/or monitor a respective technical process to be automated. As well as the communication users encompassed by the automation system, a significant component is the network provided to connect them for communication. To link it to this network, each communication user has a bus connection. In an automation system with an underlying network, e.g. Ethernet, IEEE 802.3, WLAN IEEE 802.11, CAN etc., in which the communication is handled for example by a communications protocol known under the name PROFINET, each device has a bus connection for connection to the network and a projected position of the respective device in a hierarchy of the automation system determines individual devices as masters (IO controller) and other devices as slaves (IO device). In an automation system the central unit occupies a particular hierarchical position so that at least the central unit functions in the network as a master or IO controller. Examples of slaves on the other hand are periphery modules, sensors and actors with bus capabilities etc. which occupy a subordinate position in the hierarchy of the automation system compared to the central unit. Data is exchanged between IO controller and IO devices by means of cyclic real-time communication. For such real-time communication the continuous time is broken down into consecutive cyclic time segments of the same duration, meaning that the natural continuous time is thus discretized. These time segments are referred to below as send clocks. Communication users, i.e. IO controller and IO devices which exchange data with each other with this type of cyclic real-time communication, previously had to be operated with the same send clock. This previously made it necessary for the central unit or each central unit i.e. the IO controller or each IO controller, always to be operated with a send clock which is supported by all other automation devices (IO devices) encompassed by the automation system. Generally the result of this is that, in system configurations in which devices support different send clocks, those system users which support faster/higher send clocks are not able to be operated with these faster/higher send clocks if users exist that do not support this send clock. Usually newly developed IO controllers support more send clocks than the IO devices already included in an automation solution/an automation system, especially faster or higher send clocks. If a system operator wants to exploit the higher performance or the new IO controllers, until now an update, i.e. a firmware update for example, has had to be performed on various IO devices or the IO devices themselves are to be replaced by newer IO devices with correspondingly improved communication capabilities.

One object of the present invention is accordingly to specify a method for operating an automation system in which the communication users included in the system are each able to be operated in accordance with their respective communication capabilities, so that on the one hand communication users already in use, with rather lower communication capabilities, are also able to be operated in conjunction with newer devices with improved communication performance, without the performance of the newer devices having to be reduced to a lowest common denominator.

This object is achieved by a method as claimed in the claims. To this end a method is provided for operating an automation system with a number of automation devices connected for communication with at least one central unit, with each automation device handling communication in accordance with a send clock defined accordingly for this device, that the central unit stores information about the possible send clock for this automation device in a database for each automation device with which it is able to communicate, and that the central unit handles communication with each automation device with this send clock.

The advantage of the invention lies in the fact that the central unit has knowledge of the communication performance of each automation device included in the automation system and that, with this knowledge, the central unit handles communication with each automation device with this send clock, i.e. tailored to the communication performance of the respective automation device.

Advantageous embodiments of the invention are the subject matter of the dependent claims. References used in such claims refer to the further embodiments of the subject matter of the main claim by the characteristics of the respective dependent claim; they are not to be understood as dispensing with the aim of a self-contained subjective protection for the combination of features of the referenced dependent claims. Furthermore, in respect of setting down the claims in a more exact specification of a claim in a subordinate claim, it is to be assumed that this type of restriction is not present in the preceding claims in each case.

If the device-specific configuration file is the result of an initialization process when the automation system is started up, or is the result of a project planning process of the central unit, the data needed in any event by the central unit or by each central unit for connected users is determined together with data needed for execution of the method described here and below. The data is thus available at the earliest possible time so that communication which is going on during the initialization process, provided such communication can be handled at all on the basis of the send clocks, can be handled with an "basic communication capability", i.e. a comparatively low or even minimal send clock, so that it is initially ensured that all communication users can communicate with each other on this basis. After the initialization process is concluded, communication between all communication users included in the automation system can then be undertaken in accordance with the optimization able to be achieved by the invention.

The database is preferably an extract or a section of a device-specific configuration file, with such a configuration file including various items of information about the automation devices included in the automation system and within the file information for each automation device relating to its communication capability. A device-specific configuration file is normally required in each case for the central unit or for each central unit in an automation system, in order to ensure for example that a communication connection exists to each device so that in error conditions exception handling can be initiated. The use of the device-specific configuration file to store information for a maximum possible send clock for a particular automation device is accordingly ideal as a central storage location for this type of data.

To handle communication with each automation device such that its send clock is used, there is provision for the maximum possible send clock for the respective automation device to be divided by a maximum possible send clock for the central unit and the result of the division to be used to handle communication with the respective automation device. If the maximum possible to send clock of each communication user included in the communication system is expressed here and below as its communication performance, the result of dividing the respective communication performances and using the result of the division to step down these send clocks of the central unit is an efficiently manageable option for guaranteeing that the central unit handles communication with each automation device with its send clock, i.e. with its communication performance. A background information about how the stepping down of these send clock of a communication user, i.e. in particular the central unit, can be realized, the reader is referred to EP 1 527 578 B1, which precedes the applicant's current application. As regards the division and/or the division result, the result of the situation of an automation device manufacturer that can define the communication performances of individual automation devices so that all possible send clocks are known that only a whole number results occur as division result, in particular only powers of two, i.e. "1", "2", "4", etc. If non-whole number division results are to occur, the division result will be rounded down.

The method described below and subsequently explained further is preferably implemented in software and/or firmware. Accordingly the invention also relates to a computer program for executing such a method, comprising computer, program instructions or microcode instructions for implementing the individual method steps or sequences of method steps, a data medium with such a computer program, provided parts of the method are implemented in software, i.e. a central unit of the type described at the outset, especially a so-called central unit of a programmable logic controller with a bus interface provided for communication links, of which the functionality will be described in detail here and below.

BRIEF DESCRIPTION OF THE DRAWINGS

An exemplary embodiment of the invention will be explained in greater detail with reference to the drawing. Objects or elements which correspond to each other are provided with the same reference characters in all figures. The exemplary embodiment or each exemplary embodiment is not to be understood as a restriction of the invention. Instead numerous variations and modifications are possible within the framework of the current publication, especially such variants and combinations which for example by combination or modification of individual features or elements or method steps described in conjunction with the general or specific part of the description and also contained in the claims and/or the drawing are able to be derived by the person skilled in the art in respect of the solution of achieving the object and lead by combinable features to a new object or to new method steps or sequences of method steps.

The figures show

DETAILED DESCRIPTION OF INVENTION

Figure 1:
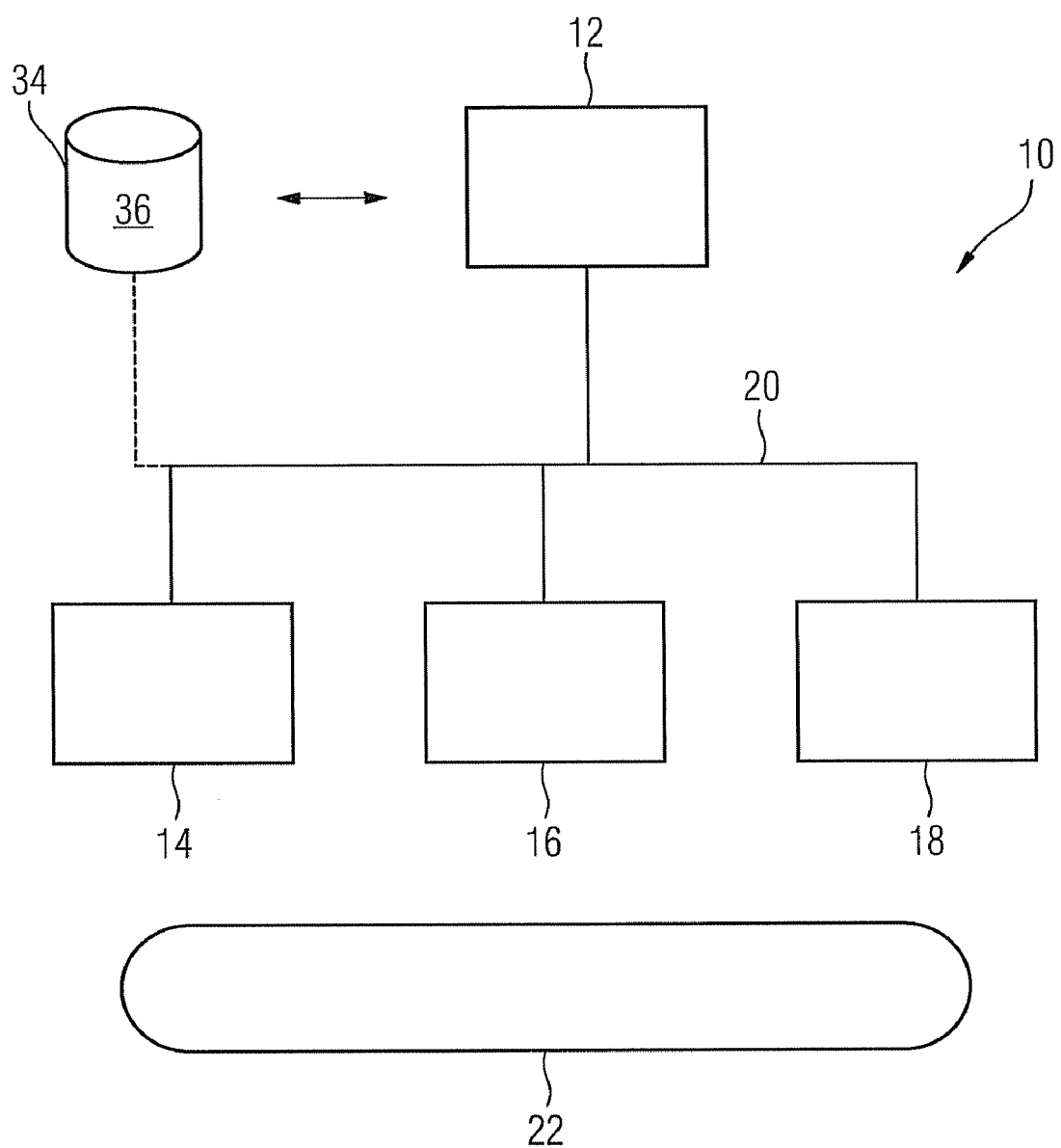
FIG. 1 an automation system.

FIG. 1 shows a simplified schematic diagram of an automation system designated as a whole by the number 10, which comprises a central unit 12 and a number of automation devices 14, 16, 18, connected for communication to the at least one central unit 12. The units are connected for communication in this case via a bus 20, especially a field bus, e.g. Ethernet, with PROFINET being used as a communication protocol for example.

The automation system 10 is intended in a known manner for controlling and/or monitoring a technical process 22 not described in any greater detail.

Figure 2:
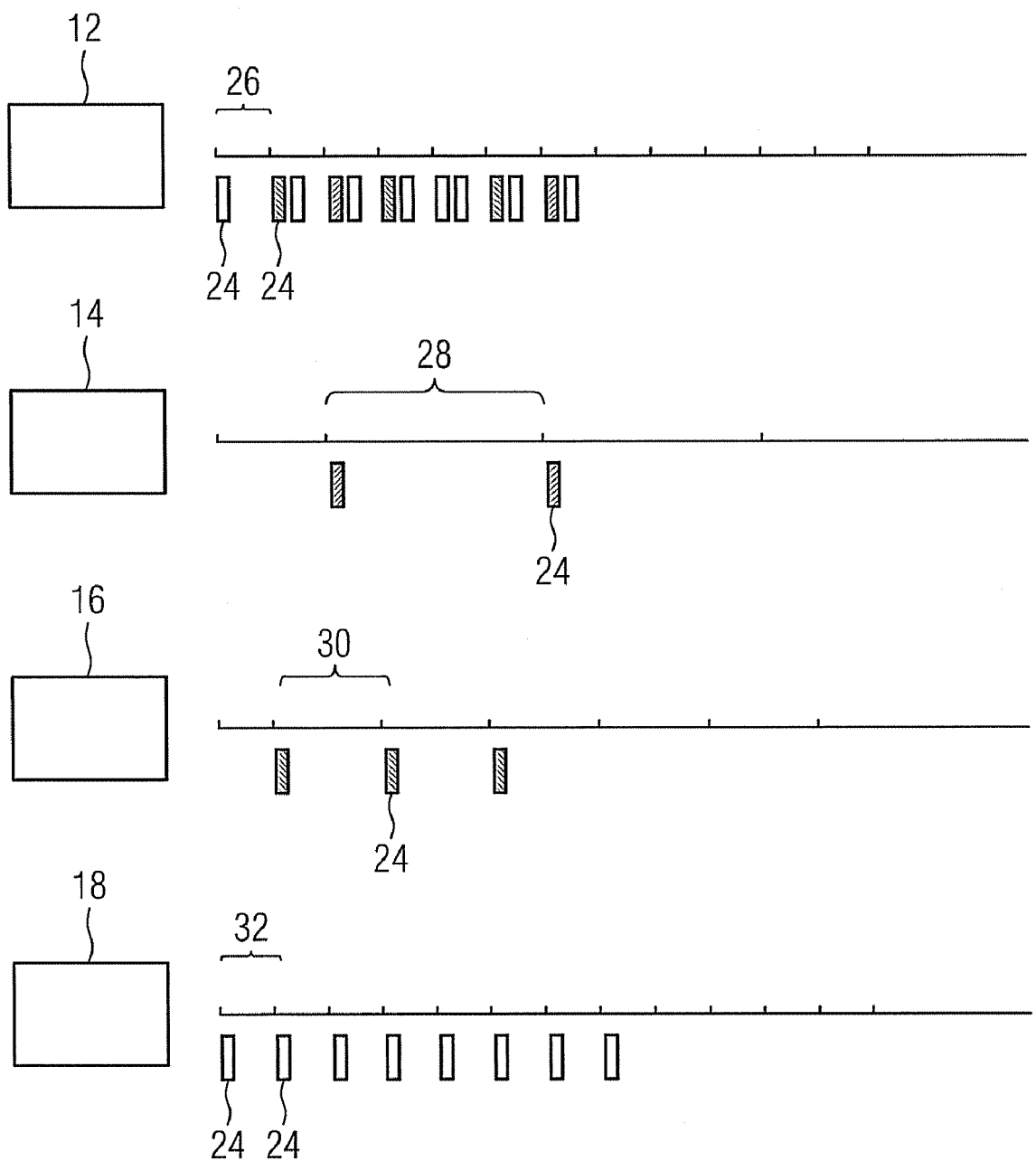
FIG. 2 a basic diagram to explain how a central unit included in the automation system handles communication with each automation device also included in the automation system with its send clock.

FIG. 2 attempts to show that in the automation system 10 (FIG. 1) data is exchanged by sending data packets 24 whereby, for the cyclic real-time communication and the transfer of the data packets 24 based thereon, the continuous time is split into consecutive cyclic time segments of the same duration (discretization of the time). These time segments are referred to below as send clocks 26-32. It can also readily be seen from the graphical diagram in FIG. 2 that the send clocks 26, 28, 30, 32 of individual automation units 14-18 included in the automation system 10 can be different.

Previously users of cyclic real-time communication had to be operated with the same send clock 26-32, so that for example, a comparatively powerful (short send clock 26) central unit 12 has to be operated with a send clock 26-32 that is basically supported by all other automation devices 14-18 included in the automation system 10. Under the circumstances shown, one of the automation devices 18 has a send clock 32 which is just as high as that of the central unit 12, another automation device 16 has a send clock 30 which by comparison is only half as fast and a further automation device 14 has a send clock 28 which by comparison to this previous slower send clock 30 is again only half as fast, i.e. is four times longer by comparison with the faster send clocks 26, 32.

To simplify the numbers involved it is assumed below that the maximum possible send clock 26 of the central unit 12 lasts for two hundred and fifty microseconds (250 μs). Accordingly a duration is produced for the send clocks 28, 30, 32 of the automation devices 14, 16, 18 of 1000 μs, 500 μs and 250 μs. To achieve the result of these central unit 12 handling communication with the respective automation device 14-18 by using this device's send clock there is provision for a maximum possible send clock for the respective automation device 14-18 to be divided by a maximum possible send clock of the central unit 12 and for the result of the division to be used as a step-down of the send clock 12 of the central unit 12 for handling communication with the respective automation device 14-18.

In detail, for the automation devices 14-18 typically shown in FIG. 1, this means that, for the automation device 14 of which the send clock lasts 1000 μs, this time value as the maximum possible send clock is divided by 250 μs as the maximum possible send clock of the central unit 12, from which the whole number "four" is produced and accordingly communication with this automation device 14 is handled by the central unit 12 with a step-down of "4", i.e. the central unit 12 can send a data packet 24 to this automation device in every fourth send clock 26.

The same applies for the further automation device 16 and its send clock 30, where for a division of 500 μs (maximum possible send clock 30 of this automation device 16) by 250 μs (maximum possible send clock 26 of the central unit 12) the whole number "two" is produced, which means for the central unit 12 and its communication with this automation device 16 that the central unit 12 can send data packets 24 to this automation device 16 in every second send clock 26.

For the last automation device 18 shown in FIG. 1 the whole number "one" is produced for its send clock 32 after the division of 250 μs as maximum of possible send clock of this automation device 18 by 250 μs as maximum possible send clock of the central unit 12, which means that the central unit 12 can exchange data packets 24 with this automation device 18 in each send clock 26.

For simplification of the overview of the receivers, i.e. the respective automation devices 14-18, of the data packets 24 transferred by the central unit 12 in its send clock 26, these are indicated by crosshatching. Data packets 24 which are intended for the automation device 14 with the send clock 28 are identified by the first crosshatching and data packets 24, which are intended for the automation device 16 with the send clock 30 indicated by a second crosshatching. Finally data packets 24 which are intended for the automation device 18 with the send clock 32 are shown without crosshatching.

When an interleaving of the send clocks 26-32, as depicted in FIG. 2, is possible, a largely even distribution of the data packets 24 to be transferred is produced for the central unit 12, which leads overall to an even distribution of the communication load in the automation system 10.

So that communication between the central unit 12 and each automation device 14-18 with its send clock 28-32 is possible, there is provision for the central unit 12 to store in a database 34 (FIG. 1) which is either included in the central unit 12 or to which the central unit 12 has access, if necessary via the bus 20, for automation devices 14-18 with which communication is possible, information about the send clock 28-32 possible for this device. For this purpose the database 34 can include a device-specific configuration file 36 which holds this information.

The invention can thus be briefly summarized as follows:

A method is proposed for operating an automation system 10 with a number of automation devices 14-18 connected for communication with at least one central unit 12, with each automation device 14-18 handling communication in accordance with a send clock 28-32, in which the central unit 12 stores in a database 34 for each automation device 14-18 accessible for communication information on the send clock 28-32 possible for this device and the central unit 12 handles communication with the respective automation device 14-18 with its send clock 28-32.

The invention claimed is:

1. A method of operating an automation system, comprising:
   providing a plurality of automation devices connected for communication with a central unit;
   each automation device communicating in accordance with a send clock;
   storing in a database of the central unit information about the send clock for each automation device; and
   the central unit communicating with each automation device with the respective send clock of each automation device,
   wherein, for communicating with each automation device, the respective send clock is used, a maximum possible send clock for the respective automation device being divided by a maximum possible send clock of the central unit, and
   wherein the result of the division is used to step down the send clock of the central unit for communicating with the respective automation device.

2. The method as claimed in claim 1, wherein the database is an extract of a device-specific configuration file.

3. The method as claimed in claim 2, wherein the device-specific configuration file is a result of a project planning of the central unit.

4. The method as claimed in claim 2, wherein the device-specific configuration file is a result of an initialization process when the automation system is started up.

5. A non-volatile computer readable medium storing a computer program with program code instructions able to be executed by a computer, the program code instructions performing a method, the method comprising:
   providing a plurality of automation devices connected for communication with a central unit;
   each automation device communicating in accordance with a send clock;
   storing in a database of the central unit information about the send clock for each automation device; and
   the central unit communicating with each automation device with the respective send clock of each automation device,
   wherein, for communicating with each automation device, the respective send clock is used, a maximum possible send clock for the respective automation device being divided by a maximum possible send clock of the central unit, and
   wherein the result of the division is used to step down the send clock of the central unit for communicating with the respective automation device.

6. The computer readable medium as claimed in claim 5, wherein the database is an extract of a device-specific configuration file.

7. The computer readable medium as claimed in claim 6, wherein the device-specific configuration file is a result of a project planning of the central unit.

8. The computer readable medium as claimed in claim 6, wherein the device-specific configuration file is a result of an initialization process when the automation system is started up.

9. A central unit of an automation system, a computer program being loaded on the central unit, the computer program having program code instructions able to be executed by the central unit, the program code instructions performing a method, comprising:
   providing a plurality of automation devices connected for communication with a central unit;
   each automation device communicating in accordance with a send clock;
   storing in a database of the central unit information about the send clock for each automation device; and
   the central unit communicating with each automation device with the respective send clock of each automation device,
   wherein, for communicating with each automation device, the respective send clock is used, a maximum possible send clock for the respective automation device being divided by a maximum possible send clock of the central unit, and
   wherein the result of the division is used to step down the send clock of the central unit for communicating with the respective automation device.

10. The central unit as claimed in claim 9, wherein the database is an extract of a device-specific configuration file.

11. The central unit as claimed in claim 10, wherein the device-specific configuration file is a result of a project planning of the central unit.

12. The central unit as claimed in claim 10, wherein the device-specific configuration file is a result of an initialization process when the automation system is started up.

* * * * *